United States Patent
Mikami et al.

(10) Patent No.: US 6,524,675 B1
(45) Date of Patent: Feb. 25, 2003

(54) ADHESIVE-BACK ARTICLES

(75) Inventors: Haruyuki Mikami, Tendo (JP); Mieczyslaw H. Mazurek, Roseville, MN (US); Patrick R. Fleming, Lake Elmo, MN (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/311,101

(22) Filed: May 13, 1999

(51) Int. Cl.[7] ................................. B32B 3/30
(52) U.S. Cl. ................. 428/40.1; 428/41.7; 428/41.8; 428/42.1; 428/156; 428/220; 428/343; 428/353; 428/358
(58) Field of Search ................ 428/40.1, 41.7, 428/41.8, 42.1, 156, 220, 343, 353, 358

(56) References Cited

U.S. PATENT DOCUMENTS

| | | | |
|---|---|---|---|
| RE24,906 E | 12/1960 | Ulrich | 206/59 |
| 5,141,790 A | 8/1992 | Calhoun et al. | 428/40 |
| 5,143,570 A | 9/1992 | Freedman | 156/230 |
| 5,268,228 A | 12/1993 | Orr | 428/343 |
| 5,362,516 A | 11/1994 | Wilson et al. | 427/207.1 |
| 5,405,675 A | 4/1995 | Sawka et al. | 428/195 |
| 5,607,763 A | 3/1997 | Matsuda | 428/323 |
| 5,650,215 A | 7/1997 | Mazurek et al. | 428/156 |
| 5,677,376 A * | 10/1997 | Groves | 525/73 |
| 5,897,930 A | 4/1999 | Calhoun et al. | 428/41.8 |

FOREIGN PATENT DOCUMENTS

| | | |
|---|---|---|
| EP | 0 279 579 | 4/1993 |
| GB | 1 511 060 | 5/1978 |
| JP | 59-51966 | 3/1984 |
| JP | 59-53787 | 3/1984 |
| JP | 59-78285 | 5/1984 |
| JP | 60-96444 | 5/1985 |
| JP | 1-256583 | 10/1989 |
| JP | 90-38574 | 2/1990 |
| JP | 3-67043 | 6/1991 |
| JP | 3-243677 | 10/1991 |
| JP | 6-184502 | 7/1994 |
| JP | 7-090231 | 4/1995 |
| JP | 07-138541 | 5/1995 |
| JP | 2503717 | 4/1996 |
| JP | 09 141812 | 6/1997 |
| JP | 2587198 | 12/1998 |
| JP | 11-323790 | 11/1999 |
| WO | WO 91/00945 | 1/1991 |
| WO | WO 94/00525 | 1/1994 |
| WO | WO 98/29516 | 7/1998 |
| WO | WO 99/35201 | 7/1999 |

* cited by examiner

Primary Examiner—Nasser Ahmad
(74) Attorney, Agent, or Firm—Brian E. Szymanski; Jean A. Lown

(57) ABSTRACT

An adhesive-backed article having a compliant film with a pressure sensitive adhesive bonded to one surface of the film. The pressure sensitive adhesive includes a microstructured surface opposite the compliant film. The microstructured surface defines channels in the adhesive. The channels create pathways for the egress of fluids. Upon application onto a substrate, the channels and structures wet out to render the microstructured surface substantially undetectable when viewed from the exposed surface of the article.

19 Claims, 6 Drawing Sheets

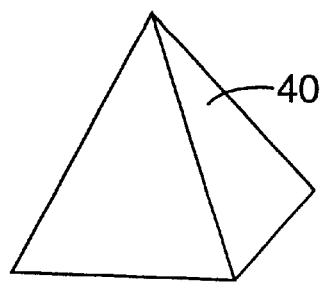
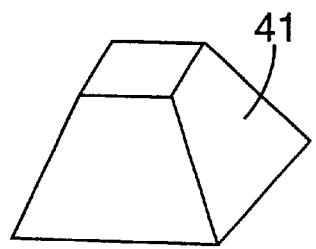
Fig. 3A          Fig. 3B
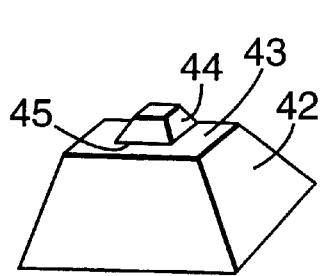
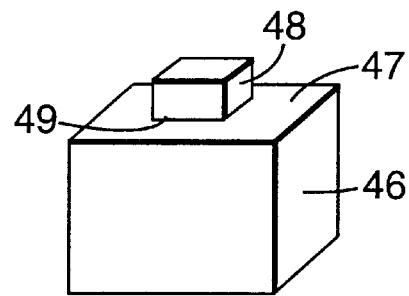
Fig. 4A          Fig. 4B
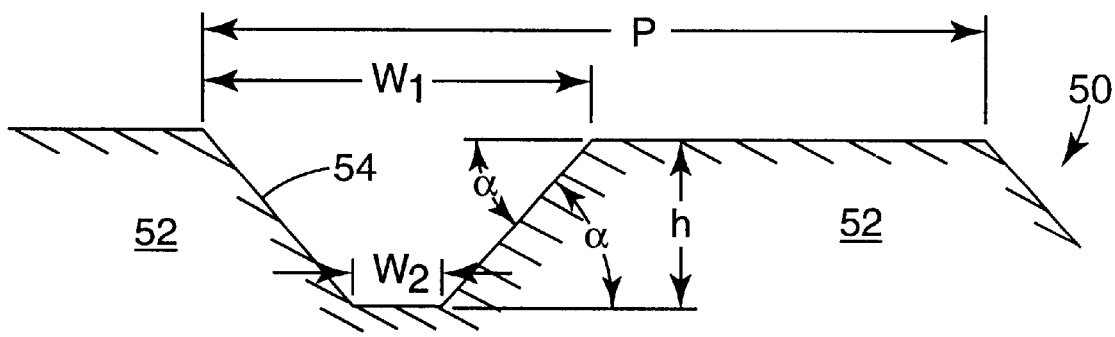
Fig. 5

ADHESIVE-BACK ARTICLES

FIELD OF THE INVENTION

The present invention relates to an adhesive-backed article, more particularly to such an adhesive-backed article having an adhesive with a microstructured surface bonded to a compliant film, and even more particularly to channels, with a specific volume per unit area, formed by the microstructured surface in the adhesive which permit the desirable properties of positionability and fluid egress to a periphery of the article without adversely affecting the surface appearance of the film after application onto a substrate.

BACKGROUND OF THE INVENTION

Films are often bonded to substrates utilizing pressure-sensitive adhesives. The films are generally bonded to a variety of different substrates including, for example, surfaces on motor vehicles. The interface between the adhesive and the contact surface of the substrate is important to the performance of the film. The interface between the adhesive and the substrate is affected by several factors. For example, the application may be affected by the type of adhesive used, the size and type of the films utilized, the surface of the substrate upon which the article is applied, the application technique utilized, or combinations thereof.

Adhesive-backed films are often used for decorative purposes. The placement of a film into a specific position prior to the formation of a bond between the adhesive and the substrate is often difficult, but important for aesthetic reasons. Some adhesive-backed articles are unable to slide on the surface of the substrate and will adhere with the slightest contact on the surface of the substrate. Such articles can often be particularly difficult to reapply if they inadvertently adhere to the substrate. The inability to slide the adhesive-backed article in place can adversely affect the positioning of the article or cause damage to the article upon attempted repositioning after adhesion.

The decorative articles also require that the adhesive-backed article be able to evacuate air or other fluids trapped underneath the adhesive during the bonding step. The ability to bleed fluids and eliminate bubbles from underneath the article improves the overall appearance of the article. Additionally, bubbles under a film can adversely affect the adhesive performance of the article.

Thin films are often utilized on surfaces so that the adhesive film blends with the substrate upon which the film is applied. Additionally, thinner films are generally more flexible and therefore suited for application on contoured surfaces. However, the utilization of thin films can create an appearance problem. The thinner films have a tendency to show all surface abnormalities or uneven portions of either the adhesive or the substrate upon which the adhesive-backed article is applied.

SUMMARY OF THE INVENTION

The present invention relates to an adhesive-backed article. The article includes a compliant film with a pressure sensitive adhesive bonded to a lower surface of the film. The pressure sensitive adhesive includes a microstructured surface opposite the compliant film.

In accordance with the present invention, the microstructured surface defines channels in the pressure sensitive adhesive. The channels comprise a volume of at least $1 \times 10^3$ $\mu m^3$ per any 500 $\mu m$ diameter circular area in the adhesive. The channels are utilized to create exit pathways for fluid egress to a periphery of the article when the article is applied to a substrate. The adhesive-backed article sufficiently bonds to a substrate as indicated by a wet out value of at least 85%. The channels are substantially undetectable on an upper surface after final application of the article onto a substrate.

In general, the adhesive-backed article of the present invention is positionable over a substrate prior to forceful application of the article onto the substrate. The microstructured surface of the adhesive permits the article to either slide over the surface of a substrate, or be easily removed from the surface of the substrate, until enough pressure is applied to enable a bond between the adhesive and the surface of the substrate. The article of the present invention also enhances the egress of fluid from the interface between the adhesive and the substrate as a bonding force is applied to the article. The microstructured features are particularly suited for applications utilizing thin films, ie less than 300 $\mu m$.

The channels of the present invention can take various shapes or patterns. The channels are generally formed by structures in the adhesive that create the microstructured surface. The structures may be either placed randomly about the surface of the adhesive or placed in regular patterns.

The microstructured surface can be formed by directly embossing the pressure sensitive adhesive layer with the structures. Alternatively, a liner or backing can be embossed first and then coated with a pressure sensitive adhesive to impart the structures to the adhesive. The film is typically laminated or bonded to a side of the adhesive layer opposite the microstructured features.

It is an advantage to provide an adhesive-backed article that has pathways in the adhesive for fluid egress and permits positioning of the article without adversely affecting the appearance of the article. The channels define pathways to the periphery of the article that permit the flow of fluid trapped between the adhesive and the surface of the substrate. Additionally, the microstructured surface of the present invention enable the positioning of the article onto a substrate. Further, the microstructured adhesive does not result in observable periodic patterns on the exposed surface of the film after application of the article onto a substrate.

For purposes of the present invention, the following terms used in this application are defined as follows:

"microscopic" refers to structures of small enough dimension so as to require an optic aid to the naked eye when viewed from any plane of view to determine its shape. One criterion is found in *Modern Optic Engineering* by W. J. Smith, McGraw-Hill, 1966, pages 104–105 whereby visual acuity, " . . . is defined and measured in terms of the angular size of the smallest character that can be recognized." Normal visual acuity is considered to be when the smallest recognizable letter subtends an angular height of 5 minutes of arc on the retina. At typical working distance of 250 mm (10 inches), this yields a lateral dimension of 0.36 mm (0.0145 inch) for this object;

"microstructure" means the configuration of structures wherein at least 2 dimensions of the structures are microscopic. The topical and/or cross-sectional view of the structures must be microscopic.;

"embossable" refers to the ability of a pressure-sensitive adhesive layer or liner to have part of its surface raised in relief, especially by mechanical means;

"wetting" or "wet out" means spreading out over and intimately contacting a surface;

"positionable" or "positionability" refers to those adhesive-backed articles that can easily slide over a substrate without grabbing or bonding to the substrate absent the application of a force, or adhesive-backed articles that upon light force are capable of releasably bonding to a substrate and upon removal retain at least some form of the original microstructured surface;

"release liner", used interchangeably with the term "liner", refers to a flexible sheet which after being placed in intimate contact with pressure-sensitive adhesive surface may be subsequently removed without damaging the adhesive coating;

"microstructured liner" refers to a liner with at least one microstructured surface, which is suitable for contact with an adhesive;

"backing" refers to a thin, flexible sheet which, after being placed in intimate contact with pressure-sensitive adhesive can not be subsequently removed without damaging the adhesive coating;

"microstructured backing" refers to a backing with a microstructured surface.

"substrate" refers to a surface to which the pressure-sensitive adhesive coating is applied for an intended purpose;

"tape" refers to a pressure-sensitive adhesive coating applied to a backing.

"inelastic deformation" means the permanent set at a given strain resulting from a film being stretched to 15% under tension and dissipating that tension.

"compliant" refers to a polymeric film that is soft and flexible as well as having sufficient inelastic deformation after being stretched so that once stretched, the film does not recover to its original length;

"bleedability" or "air-bleedability" refers to the egress of fluids, particularly air, from the interface between the adhesive and the surface of the substrate; and "appearance" means the visual characteristics of the article as viewed from the exposed surface of the film after application of the article onto a substrate.

BRIEF DESCRIPTION OF THE DRAWINGS

The invention will be more fully appreciated with reference to the following drawings in which similar reference numerals designate like or analogous components throughout and in which:

FIG. 3a is a perspective view of one embodiment of a microstructured feature according to the present invention;

FIG. 3b is a perspective view of one embodiment of a truncated microstructured feature according to the present invention;

FIG. 4a is a perspective view of one embodiment showing a double featured microstructured element according to the present invention;

FIG. 4b is a perspective view of another embodiment showing a double featured microstructured element according to the present invention;

FIG. 5 is a sectional view showing the configuration of a microstructured surface of an adhesive layer;

DETAILED DESCRIPTION

Figure 1:
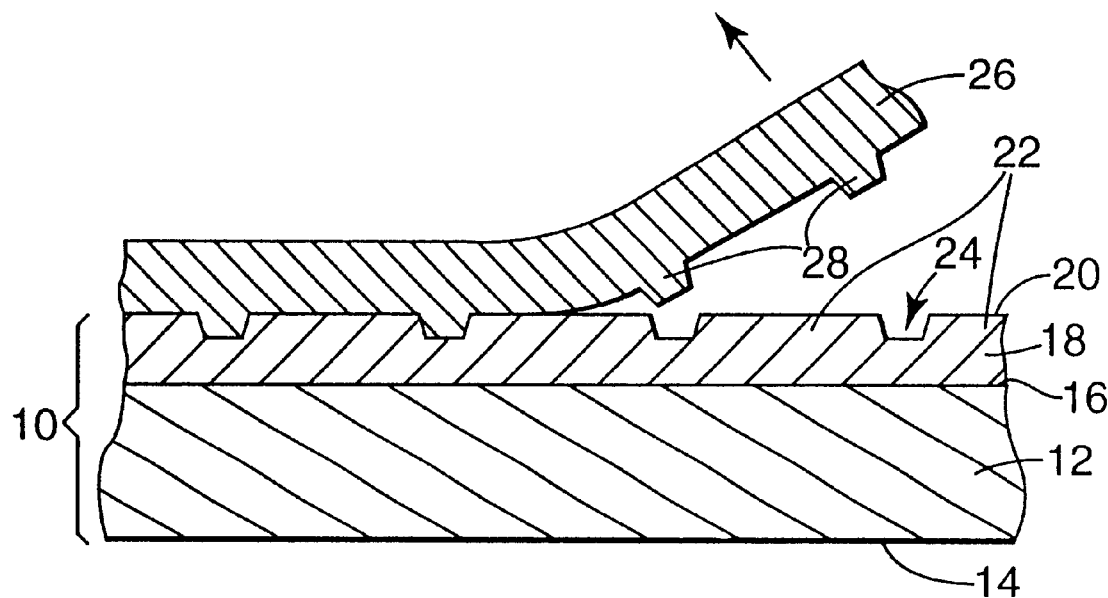
FIG. 1 is an enlarged, fragmentary, cross-sectional view of an adhesive-backed article according to the invention.

The present inventive article 10, as depicted in FIG. 1, includes a compliant film 12 having an opposing surfaces 14, 16. A pressure sensitive adhesive 18 is bonded to surface 16 of the compliant film 12. The pressure sensitive adhesive 18 includes a surface 20 that can be bonded to a substrate (not shown). The pressure sensitive adhesive 18 includes structures 22 which define channels 24. A release liner 26 is releasably attached to the pressure sensitive adhesive 18. The release liner 26 includes protrusions 28 that are utilized to form corresponding channels 24 and structures 22 in the pressure sensitive adhesive 18. The release liner 26, shown in a partially removed state, is fully detachable and is used to protect the pressure sensitive adhesive prior to application of the article 10 on a substrate.

The article of the present invention is an improvement over structured adhesives that provide some degree of egress for entrapped air. However, certain structured adhesives are not easily positioned on a substrate. Further, the structures often show through the outer surface of the film after forceful application of the article onto the substrate. This is particularly true with thin films that tend to highlight any underlying surface differences. The present invention imparts a microstructured surface which defines channels in a pressure sensitive adhesive with specific rheological characteristics to address the issues associated with conventional adhesive-backed articles. The channels in the adhesive of the present invention have specific dimensions and characteristics to improve the positionability and fluid egress to a periphery of the article. Additionally, the characteristics of the channels render the microstructured surface of the adhesive substantially undetectable to the human eye when viewed from the exposed surface of the article after application.

The compliant film utilized in the present inventive article is generally made of various plastic materials used conventionally by those skilled in the art. Suitable films include, for example, vinyl, polyvinyl chloride, plasticized polyvinyl chloride, polyurethane, polyethylene, polypropylene, fluororesin or the like. The thickness film can vary widely according to a desired application, but is usually within a range from about 300 µm or less, and preferably about 25 µm to about 100 µm.

A specific example of a suitable compliant layer is a plasticized polyvinyl chloride film, and has sufficient inelastic deformation after being stretched so that when stretched, the film does not recover to its original length. Preferably, the film has an inelastic deformation of at least 5% after being stretched once to 115% of their original length. A typical formulation of the vinyl film includes polyvinyl chloride resin, light and/or heat stabilizer(s), plasticizer, and optionally, pigment. The amount of plasticizer is generally less than about 40% by weight, and is preferably composed of polymeric non-migratable plasticizers which are compatible with the vinyl film and provide the necessary flexibility and durability. A suitable plasticizer is a combination of polymeric polyester elastomer and an ethylene vinyl acetate copolymer (such as Elvaloy 742 made by DuPont Co.) soluable in aromatic solvents and present in amounts of about 26 parts and 10 parts, respectively, per 100 parts vinyl resin.

Primers may optionally be used to enhance the bond between the film and the adhesive. The type of primer will vary with the type of film and adhesive used and one skilled in the art can select an appropriate primer. Examples of suitable primers include chlorinated polyolefins, polyamides, and modified polymers disclosed in U.S. Pat. Nos. 5,677,376, 5,623,010 and those disclosed in WO 98/15601 and WO 99/03907, and other modified acrylic polymers. Typically, primers are dispersed into an adequate solvent in very low concentrations, e.g., less that about 5% solids, and coated onto the film, and dried at room or elevated temperatures to form a very thin layer. Typical solvents used may include water, heptane, toluene, acetone, ethyl acetate, isopropanol, and the like, used alone or as blends thereof.

In accordance with the present invention, useful pressure sensitive adhesives include those which are capable of retaining microstructured features on an exposed surface after being embossed with a microstructured molding tool, backing or liner, or after being coated on a microstructured molding tool, backing or liner from which it is subsequently removed. The particular pressure sensitive adhesive selected for a given application is dependent upon the type of substrate the article will be applied onto and the microstructuring method employed in producing the adhesive-backed article. Additionally, useful microstructured pressure sensitive adhesives should be capable of retaining their microstructured surfaces for a time sufficient to allow utilization of the adhesive-backed article.

Any pressure-sensitive adhesive is suitable for the invention. Adhesives are typically selected based upon the type of substrate that they are to be adhered to. Classes of pressure-sensitive adhesives include acrylics, tackified rubber, tackified synthetic rubber, ethylene vinyl acetate, silicone, and the like. Suitable acrylic adhesives are disclosed, for example, in U.S. Pat. Nos. 3,239,478, 3,935,338, 5,169,727, U.S. Pat. No. RE 24,906, U.S. Pat. Nos. 4,952,650, and 4,181,752. A preferred class of pressure-sensitive adhesives are the reaction product of at least alkyl acrylate with at least one reinforcing comonomer. Suitable alkyl acrylates are those having a homopolymer glass transition temperature below about −10° C. and include, for example, n-butyl acrylate, 2-ethylhexylacrylate, isoctylacrylate, isononlyl acrylate, octadecyl acrylate and the like. Suitable reinforcing monomers are those having a homopolymer glass transition temperature about −10° C., and include for example, acrylic acid, itaconic acid, isobornyl acrylate, N,N-dimethylacrylamide, N-vinyl caprolactam, N-vinyl pyrrolidone, and the like.

The adhesives may be polymers that are dispersed in solvent or water and coated onto the release liner and dried, and optionally crosslinked. If a solventborne or waterborne pressure-sensitive adhesive composition is employed, then the adhesive layer must undergo a drying step to remove all or a majority of the carrier liquid. Additional coating steps may be necessary to achieve a smooth surface. The adhesives may also be hot melt coated onto the liner or microstructured backing. Additionally, monomeric pre-adhesive compositions can be coated onto the liner and polymerized with an energy source such as heat, UV radiation, e-beam radiation.

The thickness of the adhesive is dependent upon several factors, including for example, the adhesive composition, the type of structures used to form the microstructured surface, the type of substrate, and the thickness of the film. Those skilled in the art are capable of adjusting the thickness to address specific application factors. In general, the thickness of the adhesive layer is greater than the height of the structures which comprise the microstructured surface. Preferably, the thickness of the adhesive layer is within a range from about 10 to about 50 $\mu$m.

The pressure sensitive adhesive can optionally include one or more additives. Depending on the method of polymerization, the coating method, the end use, etc., additives selected from the group consisting of initiators, fillers, plasticizers, tackifiers, chain transfer agents, fibrous reinforcing agents, woven and non-woven fabrics, foaming agents, antioxidants, stabilizers, fire retardants, viscosity enhancing agents, coloring agents, and mixtures thereof can be used.

The pressure sensitive adhesive of the present invention includes a microstructured surface on an exposed surface of the adhesive opposite the compliant film. The microstructured surface defines channels in the adhesive. Channels are continuous open pathways or grooves that extend into the adhesive from the exposed surface. The channels either terminate at the peripheral portion of the adhesive layer or communicate with other channels that terminate at a peripheral portion of the article. Upon application of the article onto a substrate, the pathways provide an egress to a periphery of the article for fluid trapped at the interface between the adhesive and the substrate.

The channels are created to define a specific volume per any given area of the microstructured surface of the adhesive. The minimum volume per unit area of the adhesive ensures adequate egress for fluids at the interface of the substrate and the adhesive. Preferably, the channels define a volume of at least $1 \times 10^3$ $\mu$m$^3$ per any 500 $\mu$m diameter circular area in a two-dimensional plane of the adhesive. Most preferably, the channels define a volume in the range of above $1.0 \times 10$ $\mu$m$^3$ to about $1 \times 10^7$ $\mu$m$^3$ on any 500 $\mu$m diameter circular area.

The channels of the present invention at least partially disappear upon final application of the article, in order to provide a desirable adhesion to the exposed surface of the film. The ability of the channels to at least partially disappear is dependent upon the shape of the channel and the rheology of the adhesive. In accordance with the present invention, the channel's size and dimensions are selected for the specific pressure sensitive adhesive compositions to obtain a result of at least 85% according to the percent wet out test discussed in the "Examples" section below. The proper wet out enables a sufficient seal between the article and the substrate.

Figure 2A:
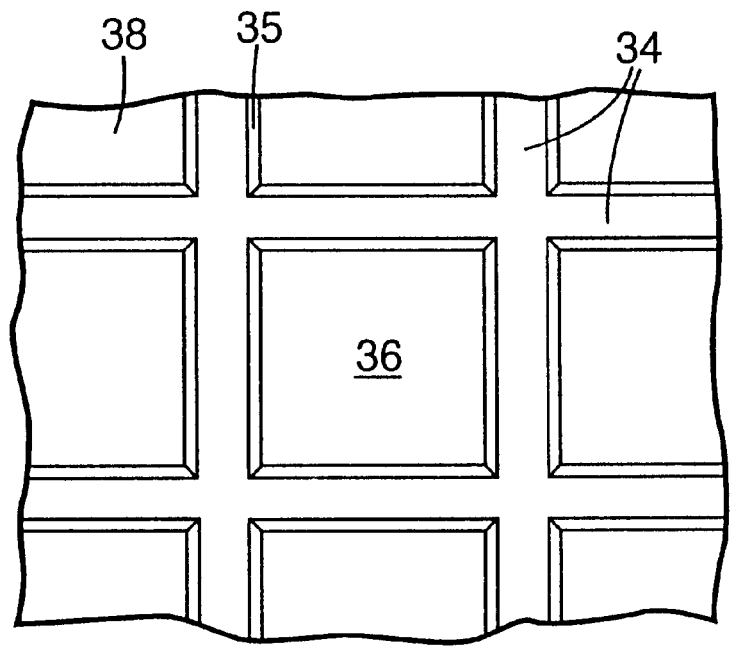
FIG. 2a is a segmented planar view of a microstructured adhesive surface according to the present invention.
Figure 2B:
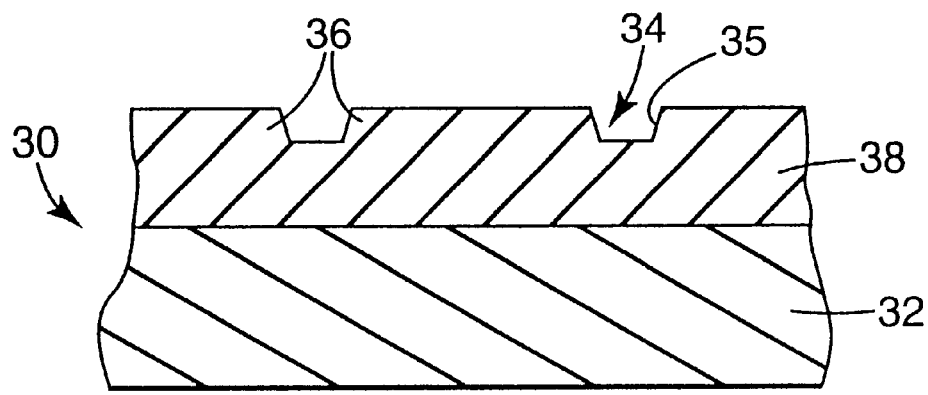
FIG. 2b is a segmented view of the adhesive backed article highlighting the microstructured features of the present invention.

The shape of the channels can vary widely according to the processing methods, but each preferably has a V-shaped, U-shaped, rectangular or trapezoidal cross section on observation in a transverse direction. FIGS. 2A and 2B show a segmented view of the inventive article 30 highlighting trapezoidal channels 34 in the adhesive 38. The adhesive-backed article 30 includes film 32 and adhesive 38. The trapezoidal channels 34 and corresponding structures 36 are formed in the adhesive 38. Side walls 35 of the structures 36 define side walls for the channels 34.

The limits of dimensions of the channels can be described by use of the aspect ratio. The aspect ratio is defined as the ratio of the greatest microscopic dimension of the channel parallel to the plane of the continuous layer of adhesive to the greatest microscopic dimension of the channel perpendicular to the plane of the continuous layer of adhesive. The aspect ratio is measured by taking the cross-sectional dimensions of the channel at an angle perpendicular to the wall of the channel. Depending on the specific type of channel, the limits of the aspect ratio would be about 0.1 to about 20. For example, the structures of FIG. 7 would define channels that would have a preferred aspect ratio of about 10 to about 15.

Channels are generally created by embossing or forming a plurality of structures into the adhesive. The structures may be present in either a random array or in regular patterns. Individual structures at least partially define a portion of a channel in the adhesive. Selected patterns could include rectilinear patterns, polar patterns and other conventional regular patterns. A plurality of structures combine to create the continuous channels on the surface of the adhesive.

The shape of the structures formed in the pressure sensitive adhesive to create the microstructured surface can vary. Examples of structure shapes include but are not limited to those selected from the group consisting of hemispheres, prisms (such as square prisms, rectangular prisms, cylindrical prisms and other similar polygonal features), pyramids, or ellipsoids. Combinations of the different structure shapes can be utilized. The preferred shapes include those selected from the group consisting of hemispheres, prisms, and pyramids. Each individual structure should typically have a height of greater than about 3 micrometers but less than the total thickness of the adhesive layer, and preferably about 3 micrometers to about 50 micrometers. Additionally, some of the structures may be truncated to provide a surface for additional structures, to control the contact surface of the adhesives, and to improve the wet out of the adhesive. FIG. 3A illustrates a quadrangle pyramid 40 as an illustration of one embodiment suitable for use with the present invention. FIG. 3B depicts a truncated quadrangle pyramid 41 that may also be embossed in the pressure sensitive adhesive of the invention.

In the adhesive-backed article of the present invention, the regular patterns or groups of structures have a specific shape and a size to achieve the desired performance parameters. Therefore, the structures are arranged at a pitch (average value of a distance between similar structural points of adjacent structures) of about 400 µm or less, and preferably about 300 µm or less. A pitch larger than 400 µm may undesirably result in a pattern of the features appearing on the surface of the film after application, thereby causing deterioration in the quality of the article's appearance.

Double featured structures are an additional embodiment that are suitable for use in the present inventive article. The stacking or use of two structures enhances the positionability of the article by further reducing the initial contacting surface of the adhesive. FIG. 4A illustrates a truncated, quadrangle pyramid 42 having an exposed surface 43. A second quadrangle pyramid 44, having a base 45, is positioned on exposed surface 43. FIG. 4B depicts another embodiment highlighting the double features of the invention. A rectangular feature 46 provides a base 47 for receiving a base 49 of a second smaller rectangular feature 48. In general, the base surface of a second structure is smaller than the exposed surface of the first feature. Additionally, different configurations or shapes may be combined with base structures to achieve the desirable positioning properties for the present invention.

The positionability of the article is affected by the area of the adhesive that initially contacts the substrate. Preferably, the contact area of the microstructured features results in an initial surface contact area of about 60% or less of the total area of the adhesive in the plane parallel to the continuous layer of adhesive. The positionability of the present invention is determined by the test noted in the "Examples" section. Preferably, the article of the present invention exhibits a positionability test rating of 2 or better.

Figure 6:
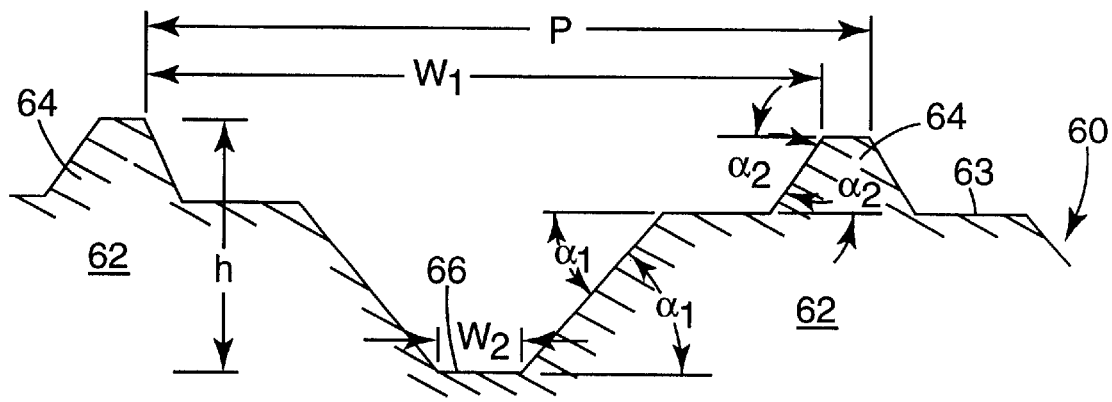
FIG. 6 is a sectional view showing a second configuration of microstructured surface of an adhesive layer.
Figure 7:
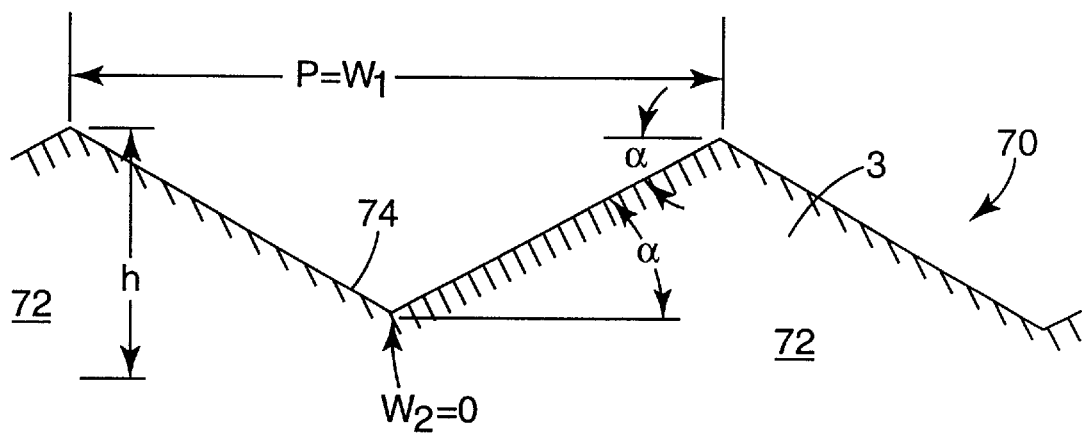
FIG. 7 is a sectional view showing an additional configuration of a microstructured surface of an adhesive layer.

FIGS. 5–7 are utilized to demonstrate the various dimensions and characteristics of the microstructured surface of the pressure sensitive adhesive. The figures represent idealized shapes corresponding to the liner. Those skilled in the art will recognize the pressure sensitive adhesive cannot hold exact tolerances with the scale of the structures utilized in the present invention. FIG. 5 is a segmented perspective view of a pressure sensitive adhesive used in the present invention. The adhesive 50 has a plurality of structures 52. The pitch P between the features 52 is not more than 400 µm. The height h of each feature 52 from the channel 54 is within a range from 3 to 30 µm, the length $W_1$ of the upside of the channel 54 is within a range from 1 µm to the size of the pitch P and furthermore a length $W_2$ of the base of the channel 54 is within a range from 0 µm to the size enough to make a base angle α of the feature to a value within a range from 1 to 90°. The aspect ratio of the corresponding channel would be no greater than 20.

FIG. 6 is an illustration of an adhesive 60 having a truncated structure 62 with a second structure 64 positioned on an upper surface 63 of the truncated structure 62. The pitch P measured from corresponding edges of second structure 64 is not more than 400 µm. The height of each structure from the base of the channel 66 is in a range of about 1 µm to about 30 µm. The length $W_1$ of the upside of the channel 66 is within a range from 1 µm to the size of the pitch P and furthennore a length $W_2$ of the base of the channel 66 is within a range from 0 µm to the size enough to make a base angle $α_1$ of the structure 62 to a value within a range from 1 to 90°. A base angle $α_2$ of the second structure 64 is within a range from 1 to 90°.

FIG. 7 corresponds to the adhesive layer 70 having a microstructured surface 72 in the shape of a quadrangular pyramid. The pitch P between the structures 72 is equal to the length $W_1$ of the upside of the channel 74 and is not more than 400 µm. The height h of each structure 72 from the base of the channel 74 is within a range from 3 to 30 µm. The length $W_2$ of the base of the channel 74 is 0 µm.

The use of a release liner or backing is one method suitable for forming the microstructured adhesive of the present invention. The release liner can be advantageously made of various materials. Preferred materials which the microstructured liner may include, but are not limited to plastics such as polyethylene, polypropylene, polyesters, cellulose acetate, polyvinylchloride, and polyvinylidene fluoride, as well as paper or other substrates coated or laminated with such plastics. These embossable coated papers or thermoplastic films are often siliconized or otherwise treated to impart improved release characteristics. The thickness of the release liner can vary widely according to the desired effect. Furthermore, it is possible to afford structures to the release liner by using various techniques, such as those disclosed in U.S. Pat. No. 5,650,215 (Mazurek), herein incorporated by reference in its entirety.

Figure 8:
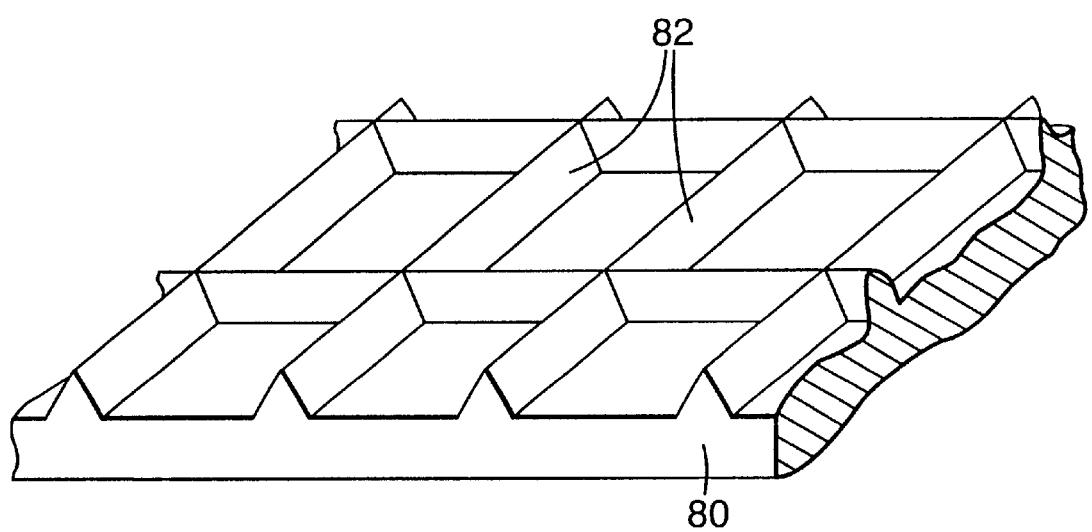
FIG. 8 is a perspective view of a release liner suitable for forming a microstructured surface in an adhesive according to the present invention.

FIG. 8 depicts a liner 80 suitable for creating structures on the surface of an adhesive. The liner 80 includes protrusions 82 that form channels in an adhesive as the adhesive is cast onto the liner.

The article of the present invention is produced by imparting the inventive microstructured surface onto an adhesive with practices conventionally recognized in the art. The features are imparted by embossing the adhesive directly through utilization of molding tools or by coating the adhesive onto a liner or backing previously embossed with the inventive features. Such methods and practices are fully disclosed in U.S. Pat. No. 5,650,215, previously incorporated by reference.

The above-described article can be applied to a variety of substrates, including smooth air-tight surfaces. It is important to match a specific pressure sensitive adhesive to a substrate in order to achieve the desired level of adhesion. Examples of suitable substrates include glass, metal, plastic, wood, and ceramic substrates, and painted surfaces of these substrates. Representative plastic substrates include polyvinyl chloride, ethylene-propylene-diene monomer rubber, polyurethanes, polymethyl methacrylate, engineering thermoplastics (e.g., polyphenylene oxide, polyetheretherketone, polycarbonate), and thermoplastic elastomers. The substrates are generally smooth substrates that accentuate the need for an article with fluid egress. Substrates with rough surface inherently provide an egress for fluids trapped an interface of an applied article because the rough surface permits fluid flow.

The application of the article requires the positioning of the article over the substrate. The microstructured surface of the present invention enable the movement of the adhesive-backed article about the surface of the substrate until pressure is applied to enable adhesive contact and wet out of the adhesive on the surface of the substrate. The appropriate level of pressure and resulting wet out will create a bond between the adhesive and the substrate.

Upon forceful application of the article, the channels permit any entrapped fluid to bleed out around the periphery of the article, thereby eliminating air bubbles. Additionally, the microstructured features of the present invention at least partially collapse during application of the article and thereby increase the amount of adhesive in contact with the substrate. The at least partial disappearance of the channels is indicated through the wet out test, described in the "Examples" below. The present invention demonstrates wet out test results of at least 85%, and preferably at least 95%. The at least partial disappearance of the channels ensures that the article has a desirable level of adhesion to the substrate.

In accordance with the present invention, the microstructured surface of the article is substantially undetectable from the surface of the film and therefore improves the overall appearance of the article. One method for measuring the appearance involves the use of the surface roughness test procedure, fully described in the "Examples" section. The present invention, upon application of the article onto a substrate, exhibit, from the upper surface of the compliant film, an appearance having no periodicity or repetitive pattern. Additionaly, the present invention has a surface roughness no greater than the roughness of the film by itself.

The invention will now be described further by way of the following non-limiting examples.

EXAMPLES

Surface Roughness Test

The surface topography of a film is measured using the RST Plus surface profiling system available from Wyko Corporation in the vertical scanning interferometer mode (VSI) at a magnification of 1.2× and a pixel size of 13.64 µm.

The system uses an interference microscope and a computer algorithm to analyze the surface. In the system, a white light beam passes through a microscope objective to the sample surface. A beam splitter reflects half of the incident beam to a reference surface. The beams from the sample and the reference surface recombine at the beam splitter to form interference fringes which are alternating light and dark bands that are visible when the surface is in focus. The reference arm containing the interferometric objective moves vertically to scan the surface at varying heights using a linearized piezoelectric transducer to control the motion. The interference fringes for white light are present only over a very shallow depth for each focus position so the fringe contrast at a single sample point reaches a peak when the point is in focus. The system starts above the focus point and scans the surface at evenly spaced intervals as the camera captures frames of interference data which contain interference signals for each point on the surface. A computer algorithm processes the data to calculate surface heights.

Figure 9:
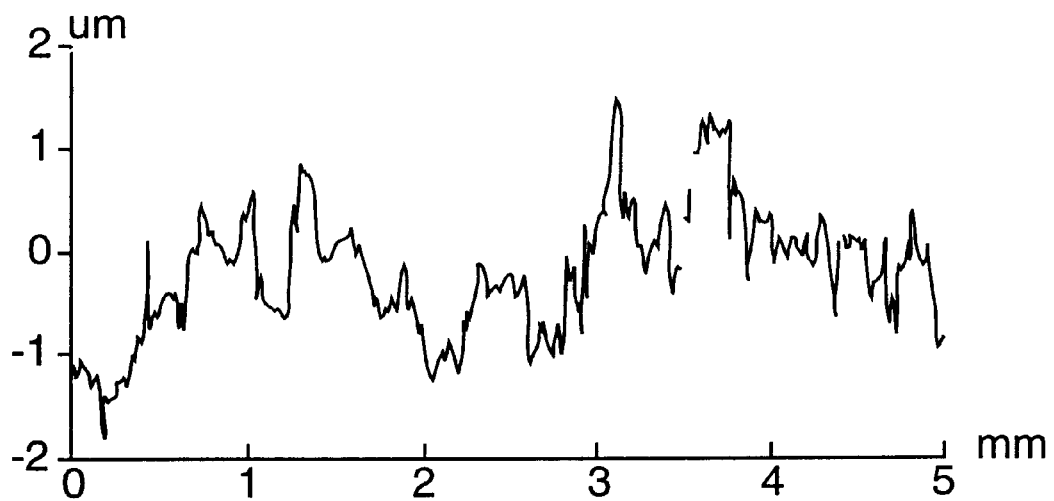
FIG. 9 is a graph indicating the surface roughness of the article of the present invention after it is applied onto a substrate.
Figure 10:
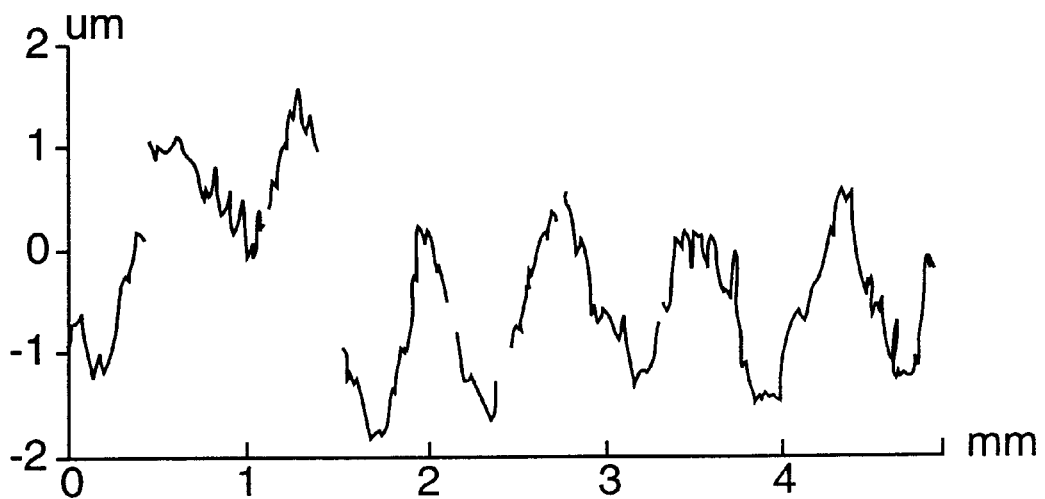
FIG. 10 is a graph indicating the surface roughness of a comparative article after it is applied onto a substrate.

A single line analysis of the surface, such as those indicated in FIGS. 9 and 10, provides a plot of the surface heights along a single line of the sample. The peaks on the plot show whether or not the surface has any periodicity, i.e., a repeating pattern of peaks. The analyses are performed with the tilt term removed to eliminate extraneous data due to the interferometer configuration. The magnification is 1.2× and the pixel size is 13.64 µm. Evidence of periodicity for an adhesive backed film is generally apparent when the roughness of the adhesive-backed film exhibits a surface roughness greater than the surface roughness of the uncoated film. The surface roughness (Ra) is the arithmetic average roughness for the area sampled.

Percent Wetout Test

This technique is used to study the wetting of an adhesive having a microstructured surface onto a smooth transparent substrate. The hardware used with this technique consists of a stereo-microscope (Olympus Model SZH-ZB), a video-camera (Cohu Model 4815) mounted on the microscope, a coaxial vertical illuminator (Olympus Model TL2), and a computer (Hewlett-Packard Vectra QS/20) with a video digitizing board (Imaging Technologies PCVISIONplus) installed which allows the computer to capture and digitize an image. Such an image can subsequently be stored and analyzed by commercial software packages (Jandel JAVA). The coaxial vertical illuminator provides light which is sent through the lens (i.e., the optic axis) to illuminate the subject. This light passes through a circular polarizer mounted on the end of the planar objective lens of the microscope. In practice, the procedure is as follows:

1. Apply the adhesive tape onto a glass (or other optically clear and flat) surface with one pass of a 2 kg roller.
2. Position the laminate so that the adhesive/glass interface is viewed through the glass by a stereo microscope.
3. Adjust the sample so that the glass is perpendicular to the optic axis.
4. Adjust the circular polarizer to optimize light intensity and contrast.
5. Using the image analysis software, capture and digitize the image.
6. Set the software grey value window of acceptance to accept only those grey values (i.e., brightness levels) corresponding to the wet areas.
7. Upon application of the tape, analyze the total wetted area as a percentage of the total imaged area.

Slide Test for Positionability

A horizontal glass plate, at about 23° C., was cleaned with methyl ethyl ketone (MEK). A test sample (i.e., pressure sensitive adhesive on the indicated backing), approximately 2.5 cm by 7.5 cm, was draped flat onto the glass plate with the pressure sensitive adhesive side down for approximately 10 seconds. The end edge of the sample was lifted and pulled laterally. The test ratings are as follows:
1. sample slid freely
2. sample slid easliy with some resistance
3. sample slid with considerable resistance because of adhesion to the plate, but could be lifted without damage
4. sample stuck to the plate and could not be repositioned without damage Volume of Air Channels The volume of the air channels were calculated based on the sizes of the microstructures in a 500 micrometer diameter circle in the liner. The results are reported in cubic microns per 500 μm circle. The volume of air channels is calculated and indicated in Table 1.

Examples 1–11 and Comparative Examples C1–C5

Embossing rolls were cut with diamond tools or laser machined to provide patterns having varying pitch, depth, widths at the top of the channel and at the base of the channel, and base angles. Polyethylene coated paper release liners having a silicone coating over the polyethylenes, such as those available from Rexam or Inncoat, were embossed between a heated rubber roll and each of the embossing roll to produce microstructured liners with ridges. The rubber roll was heated to a temperature of 110° C. and the poly-coated paper was heated to a surface temperature of 110° C. before entering the nip between the rubber roll and the embossing roll. The liners traveled around approximately half of the embossing roll, and then onto a cold can which cooled the liner. The dimensions of the microstructures on the liners are shown in Table 1 and have the shape of inverted square pyramids. The pitch is the distance from one microstructure to the same point on the adjacent microstructure, the height is the height of the microstructure from the base of the channel, W1 is the length of the top of the trapezoidal channel and W2 is the length of the bottom of the trapezoidal channel.

A solvent based acrylic pressure-sensitive adhesive was prepared according to the pressure sensitive adhesive (PSA) copolymer procedure of U.S. Pat. No. 4,737,577, incorporated herein by reference, using 90 parts isooctyl acrylate and 10 parts acrylic acid. The PSA was diluted to about 25% solids with an aziridine crosslinking agent, such as those disclosed in U.S. Pat. No. 5,648,425.

The pressure-sensitive adhesive solution was coated onto the microstructured liners to a dried coating thickness of about 30 micrometers. The solution on each liner was dried at 100° C. for 10 minutes to form an adhesive film having a microstructured surface defining trapezoidal channels with the approximate dimensions calculated from the liner shown in Table 1.

The exposed adhesive side of each example was then laminated at room temperature to a 50 micron thick primed white plasticized flexible and compliant vinyl (PVC) film primed with an acrylic polymer modified with 2-methylaziridine. The primer was an amine functional acrylic polymer in ethyl acetate. The lamination was made using a two roll nip to provide flat pressure-sensitive adhesive coated PVC films. The films were tested for Appearance, Air Bleed Capability, Slidability, and Wet-out according to the above described Test Methods. Test results are shown in Table 1.

TABLE 1

| | Pitch μm | Height μm | W1 μm | W2 μm | Angle α1 ° | Avg. Vol (μm³) per any 500 μm circular area | Appearance | Air Bleedability | Slidability | Wet-out % |
|---|---|---|---|---|---|---|---|---|---|---|
| 1 | 126 | 16 | 34 | 17 | 62 | $1.1 \times 10^6$ | Good | Good | 3 | |
| 2 | 198 | 21 | 67 | 3 | 39 | $1.1 \times 10^6$ | Good | Good | 3 | 90.4 |
| 3 | 198 | 22 | 28 | 3 | 62 | $6.1 \times 10^5$ | Good | Good | 3 | 93.5 |
| 4 | 197 | 15 | 18 | 1 | 60 | $2.8 \times 10^5$ | Good | Good | 3 | 98.4 |
| 5 | 200 | 15 | 200 | 0 | 9 | $1.9 \times 10^6$ | Good | Good | 2 | 98.7 |
| 6* | 197 | 25 | 197 | 3 | 28 | $3.3 \times 10^5$ | Good | Good | 2 | 99.0 |
| 7 | 203 | 20 | 35 | 12 | 60 | $8.5 \times 10^5$ | Good | Good | 3 | |
| 8 | 297 | 20 | 35 | 12 | 60 | $6.0 \times 10^5$ | Good | Good | 3 | |
| 9 | 198 | 19 | 38 | 22 | 72 | $9.9 \times 10^5$ | Good | Good | | |
| 10 | 198 | 19 | 28 | 11 | 71 | $6.3 \times 10^5$ | Good | Good | | |
| 11 | 197 | 20 | 24 | 1 | 60 | $4.8 \times 10^5$ | Good | Good | 3 | 98.5 |
| C1 | 1270 | 22 | 61 | 27 | 52 | ** | Poor | Good | 3 | |
| C2 | 770 | 20 | 143 | 96 | 40 | ** | Poor | Good | 3 | |
| C3 | 508 | 20 | 35 | 12 | 60 | ** | Poor | Good | 3 | |

*Includes a secondary feature with a base angle of 60°
**Volume indeterminate within a given 500 μm circle Examples 1–11, produced in accordance with the present invention, exhibit good appearance, good air bleedability, and at least fair slidability. The appearance was determined by visual examination with the unaided eye. A good appearance result indicates no observable underlying structure. A poor appearance results if the pattern is visible. With respect to Examples C1–C3, the average volume per any 500 μm diameter circular area is indeterminate since some 500 μm diameter circular areas do not have channels. Additionally, Examples C1–C3 have poor appearance indicating that patterns created by the channels are visible with the human eye after application.

Samples from each Example measuring approximately 2.54 cm by 2.54 cm were then laminated to a clean glass plate using a plastic squeegee. The samples were then analyzed for surface roughness and periodicity according to the procedure described above. Example C4 is the vinyl film with no adhesive laminated to it, and C5 is the vinyl film with a non-structured PSA laminated to it. Results are shown in Table 2.

TABLE 2

| Ex | $R_a$ Value - µm | Single Line Analysis | PSD |
|---|---|---|---|
| 1 | 0.99 | Irregular peaks, no peridocity | No spikes |
| 2 | 0.50 | Irregular peaks, no periodicity | No spikes |
| 5 | 0.85 | Irregular peaks, no periodicity | No spikes |
| 6 | 0.54 | Irregular peaks, no periodicity | No spikes |
| C2 | 1.60 | Definite repeating peaks | |
| C4 | 1.31 | Irregular peaks, no peridocity | |
| C5 | 0.65 | Irregular peaks, no periodicity | |

Examples 1, 2, 5 and 6 have arithmetic average roughness values comparable to that of a vinyl film (Example C5). Example 2, as illustrated in FIG. 9, shows no periodicity or repeating patterns. Example C2 has a higher arithmetic average roughness, but more importantly a repeating pattern or periodicity as indicated by the interferometer data. The periodicity of Example C2, as illustrated in FIG. 10, corresponds to the pitch of the channels in the structured surface of the adhesive. The patterns in C2 are detectable with the human eye. Example C4 has a roughness greater than the vinyl film (Example C5) due to microbubbles present in the adhesive. Examples C4 exhibits no periodicity because the adhesive is not structured.

From the above disclosure of the general principles of the present invention and the preceding detailed description, those skilled in this art will readily comprehend the various modifications to which the present invention is susceptible. Therefore, the scope of the invention should be limited only by the following claims and equivalents thereof.

What is claimed is:

1. An adhesive-backed article, comprising:
   (a) a compliant film having an upper surface and a lower surface; and
   (b) a pressure sensitive adhesive bonded to the lower surface of said film, said pressure sensitive adhesive having a microstructured surface, opposite said film, forming channels that define exit pathways, the channels define a volume of at least $1 \times 10^3$ µm$^3$ per any 500 µm diameter circular area of the microstructured surface of said adhesive, each pathway providing a continuous fluid egress to a periphery of said article when said article is applied to a substrate, said adhesive-backed article being sealable as indicated by an initial percent wet out test result of at least 85%, and the channels being substantially undetectable on the upper surface of said compliant film, after final application of said article onto the substrate.

2. An adhesive-backed article as recited in claim 1, wherein said adhesive-backed article is positionable over a surface of a substrate.

3. An adhesive backed article as recited in claim 2, wherein upon initial contact said article exhibits an initial surface contact area of about 60% or less of the total area of said adhesive.

4. An adhesive-backed article as recited in claim 2, wherein said film exhibits a slide test for positionability rating of 2 or better.

5. An adhesive-backed article as recited in claim 1, wherein said channels have an aspect ratio in the range of about 0.1 to about 20.

6. An adhesive-backed article as recited in claim 1, wherein the channels have a cross-sectional form of v-grooves, u-grooves, rectangles, trapezoids, or combinations thereof.

7. An adhesive-backed article as recited in claim 1, wherein said microstructured surface comprises a plurality of structures which at least partially define the channels.

8. An adhesive-backed article as recited in claim 7, wherein the structures are selected from the group consisting of hemispheres, prisms, pyramids, ellipsoids, or combinations thereof.

9. An adhesive-backed article as recited in claim 7, wherein the structures are truncated.

10. An adhesive-backed film as recited in claim 9, wherein the truncated structures have a second structure of said adhesive formed thereon.

11. An adhesive-backed article as recited in claim 7, wherein the structures are randomly placed about the microstructured surface of said adhesive.

12. An adhesive-backed article as recited in claim 7, wherein the structures are regularly placed about the microstructured surface of said adhesive.

13. An adhesive-backed article as recited in claim 12, wherein the structures are positioned at a pitch in the range of about 400 µm or less.

14. An adhesive-backed article as recited in claim 1, wherein said article, upon application of said pressure sensitive adhesive onto a surface of a substrate, exhibits from the upper surface of said compliant film an appearance having no periodicity and no surface roughness beyond the surface roughness of the film by itself in accordance with surface roughness test procedures.

15. An adhesive-backed article as recited in claim 1, further comprising a primer layer bonding said film to said pressure sensitive adhesive.

16. An adhesive-backed article as recited in claim 1, further comprising a release liner bonded to the microstructured surface of said pressure sensitive adhesive.

17. An adhesive-backed article as recited in claim 1, wherein said adhesive-backed article is applied onto a substrate.

18. An adhesive-backed article, comprising:
   (a) a compliant film having an upper surface and a lower surface;
   (b) a pressure sensitive adhesive having a first surface and a second surface, said first surface bonded to the lower surface of said film; and
   (c) a release liner bonded to the second surface of said pressure sensitive adhesive, said release liner having a microstructured surface that defines a microstructured surface in the second surface of said pressure sensitive adhesive, the microstructured surface in said adhesive forming channels that define exit pathways, the channels define a volume of at least $1 \times 10^3$ µm$^3$ per any 500 µm diameter circular area of the microstructured surface of said adhesive, each pathway providing a continuous fluid egress to a periphery of said article when said release liner is removed and said article is applied to a substrate, said adhesive-backed article being sealable as indicated by an initial percent wet out test result of at least 85%, and the channels being substantially undetectable on the upper surface of said compliant film, after removal of the release liner and final application of said article onto the substrate.

19. A release liner suitable for receiving a pressure sensitive adhesive, said release liner comprising a microstructured surface that is capable of imparting the microstructured surface in the pressure sensitive adhesive of claim 1.

* * * * *